United States Patent [19]
Sawagata

[11] Patent Number: 5,862,294
[45] Date of Patent: Jan. 19, 1999

[54] VIDEO SIGNAL REPRODUCING APPARATUS IN IMAGE FAST LOCKING SYSTEM

[75] Inventor: Kiyoshi Sawagata, Kanagawa, Japan

[73] Assignee: Sony Corporation, Japan

[21] Appl. No.: 75,338

[22] Filed: Jun. 11, 1993

Related U.S. Application Data

[63] Continuation of Ser. No. 958,469, Oct. 8, 1992, abandoned, which is a continuation of Ser. No. 823,613, Jan. 17, 1992, abandoned, which is a continuation of Ser. No. 355,344, May 23, 1989, abandoned.

[30] Foreign Application Priority Data

May 27, 1988 [JP] Japan .................................. 63-128450

[51] Int. Cl.$^6$ ................................ H04N 5/76; H04N 5/92
[52] U.S. Cl. ................................ 386/62; 386/65; 386/88; 386/90
[58] Field of Search ..................................... 358/311, 336, 358/310, 335; 360/14.1, 14.2, 14.3; 386/52, 60, 62, 65, 66, 88, 90–91; H04N 5/76, 5/78, 5/781, 5/782, 5/783, 9/79, 5/94

[56] References Cited

U.S. PATENT DOCUMENTS

| | | |
|---|---|---|
| 4,157,571 | 6/1979 | Shu . |
| 4,290,081 | 9/1981 | Foerster . |
| 4,612,569 | 9/1986 | Ichinose ................................. 358/311 |
| 4,698,664 | 10/1987 | Nichols et al. .......................... 358/311 |
| 4,802,023 | 1/1989 | Williams ................................. 360/14.3 |

FOREIGN PATENT DOCUMENTS

| | | |
|---|---|---|
| 0207762 | 6/1986 | European Pat. Off. . |
| 0272090 | 12/1987 | European Pat. Off. . |
| 2813440 | 11/1988 | Germany . |
| 1201122 | 8/1970 | United Kingdom . |
| 2145867 | 3/1985 | United Kingdom . |
| 8504042 | 2/1985 | WIPO . |

OTHER PUBLICATIONS

Patents Abstracts of Japan, vol. 7, No. 21, Jan. 27, 1983.
PCT/GB85/00081 International Patent Application, filed 28 Feb. 1985.

*Primary Examiner*—Thai Tran
*Attorney, Agent, or Firm*—Ronald P. Kananen

[57] ABSTRACT

A video signal reproducing apparatus in a system for fast locking a reproduced image obtained from a recording medium where a time code signal is also recorded. The apparatus includes a memory for storing plural frames of the video signal, a time code comparator for generating a control signal by comparing the time code signal obtained from the recording medium with an external reference time code signal, and a reading controller for controlling the memory and selectively reading one frame of the video signal therefrom in accordance with the control signal so that the time code signal corresponding to the video signal selectively read by the reading controller coincides with the reference time code signal. The video signal reproduced by the apparatus placed in a standby state at a preroll point can be raised to a stable normal reproduction state within a relatively short time. Such video signals retained in synchronism are sequentially stored in the frame memories and, after being delayed per frame, the video signal coincident with the external time code signal is selected, whereby the lock-in operation can be quickly completed to consequently reduce the amount of preroll.

11 Claims, 3 Drawing Sheets

VIDEO SIGNAL REPRODUCING APPARATUS IN IMAGE FAST LOCKING SYSTEM

This application is a continuation of application Ser. No. 07/958,469 filed Oct. 8, 1992 now abandoned, which is a continuation of 07/823,613, filed Jan. 17, 1992, now abandoned, which is a continuation of 07/355,344 filed May 23, 1989, now abandoned.

BACKGROUND OF THE INVENTION

1. Field of the Invention

The present invention relates to a video signal reproducing apparatus in an image fast locking system which feeds an external reference time code to the apparatus capable of reproducing video signals recorded on a magnetic tape and outputs the selected video signal coincident with such reference time code.

2. Description of the Prior Art

In any broadcasting station or editing factory, there is used a magnetic recording/reproducing apparatus such as a video tape recorder (hereinafter referred to as a VTR) which is capable of reproducing a designated video signal at a timing coincident with a reference signal supplied from an external unit.

Particularly in an editing mode, there is used, as such external reference signal, a time code representing the time and the frame number of a relevant image on a magnetic tape where one program has already been recorded, and the recorded program is rearranged in response to such time code. With regard to any commercial broadcast, its start time is determined in accordance with the time code generated in the broadcasting station.

Such time code is so standardized as to be readable by any of the various video apparatus. In the case of a magnetic tape with video signals recorded thereon, digital signals representing at least the hour, minute, second and frame number are recorded in a time code track formed in the longitudinal direction of the magnetic tape. Such digital signals are recorded also in a video track so as to be readable even when the magnetic tape is brought to a halt or is driven in a super-slow reproduction mode.

Generally a vertical interval time code (VITC) in the video track is recorded in a designated horizontal line during the vertical blanking interval, so that the halt position of the magnetic tape can be confirmed by reading out such signal even when the VTR is in a still reproduction state.

In the VTR capable of reading out the designated time code (VITC) and reproducing the desired image corresponding to such time code, when the time code TC(D) of the image to be reproduced is designated as shown in FIG. 3 for example, first the magnetic tape is driven in a normal-speed forward mode FW or reverse mode REV to the vicinity of the start position represented by such time code, and after overrunning the position of the time code TC(P) relative to a preroll point, the tape is driven in the reverse direction at $\frac{1}{20}$ speed. And upon a reading of the time code TC(P) relative to the preroll point, the tape is brought to a halt at such point and then is placed in a standby state.

Subsequently, when a start signal is inputted at an instant $t_0$, the tape is driven in a reproducing mode from the preroll point. However, the time code of the video data reproduced by the VTR immediately after the start fails to be completely coincident with the external reference time code, so that a phase modifier incorporated in the VTR or editing apparatus functions for lock-in at an instant $t_1$ where the time code of the reproduced image coincides with the external reference time code.

Thus, in reproduction of the video data from a predetermined position by the VTR, it is impossible to obtain the desired reproduced data coincident with the external time code at least during the time from the start of the VTR operation to the termination of the phase modification, i.e. during the time (T) required until a coincidence is attained between the frame number designated by the external reference time code and the frame number of the reproduced image from the VTR.

Therefore, if the phase modification time (T) becomes as long as 5 seconds or so, some problems arise to exert various harmful influences on the editing or broadcasting work.

Meanwhile, for shortening the phase modification time (T), it is necessary to employ a large-sized motor in the tape drive mechanism and also an enhanced servo-mechanism to diminish the response time, hence inducing higher production cost of the VTR.

OBJECT AND SUMMARY OF THE INVENTION

The present invention has been accomplished in view of the problems mentioned above. Its object resides in providing an improved apparatus bay the provision of memory means on the reproduction output side of a VTR, which is supplied with a reference time code, for sequentially storing video signals of several frames, wherein the time code of the video signal reproduced by the VTR is compared with the external reference time code so that desired video data can be selected out of those stored in such memory means.

The video signal reproduced by the VTR placed in a standby state at a preroll point can be raised to a stable normal reproduction state within a relatively short time. Therefore, the present invention is so contrived that such video signals retained in synchronism are sequentially stored in a plurality of frame memories and, after being delayed per frame, the video signal coincident with the external time code is selected, whereby the lock-in operation can be completed rapidly consequently to reduce the amount of preroll.

According to one aspect of the present invention, there is provided an improved video signal reproducing apparatus in an image fast locking system for reproduction of a video signal recorded on a recording medium where a time code signal is also recorded correspondingly to each frame of fields of the video signal. The apparatus comprises first reproducing means for reproducing the video signal from the recording medium; memory means for storing plural frames of the video signal reproduced from the recording medium; second reproducing means for reproducing the time code signal from the recording medium; time code comparing means for comparing the time code signal reproduced by the second reproducing means with a reference time code signal supplied from outside, thereby generating a control signal; and reading control means for controlling the memory means and selectively reading one frame of the video signal from the memory means in accordance with the control signal so that the time code signal corresponding to the video signal selectively read by the reading control means coincides with the reference time code signal.

DETAILED DESCRIPTION OF THE PREFERRED EMBODIMENTS

Hereinafter an exemplary embodiment of the present invention will be described with reference to the accompanying drawings.

Figure 1:
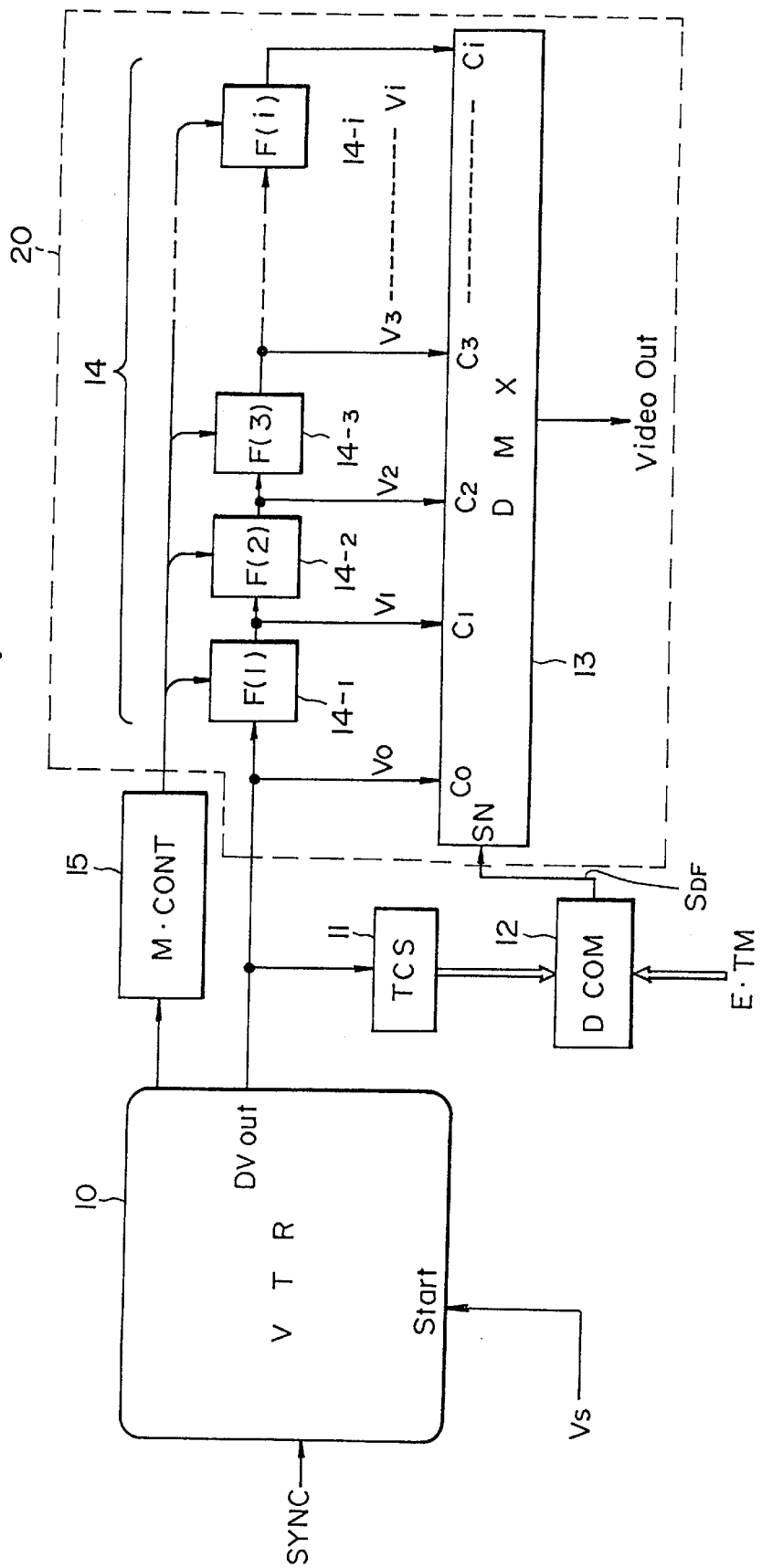
FIG. 1 is a block diagram showing an exemplary embodiment of the video signal reproducing apparatus of the present invention for use in a reproduced-image fast locking system.

FIG. 1 is a block diagram schematically showing the video signal reproducing apparatus of the invention for use in a reproduced-image fast locking system.

Denoted by the reference numeral 10 in this diagram is a VTR capable of reproducing a video tape where time codes are prerecorded. In a broadcasting station or the like, a synchronizing signal SYNC is inputted to such VTR from an external unit.

Upon designation of a time code representing an edit start point or a broadcast start point, a preroll point anterior to the time code by several tens of frames is detected, and the magnetic tape is brought to a halt at such preroll point to place the VTR in a standby state.

There are also shown a time code extractor 11 for extracting the time code of a reproduced image, and a digital comparator 12 for comparing the data from the time code extractor 11 with a reference time code E·TM obtained from an external unit. A frame difference signal $S_{DF}$ based on the data difference between the time code of the reproduced image and the external time code is supplied to a demultiplexer 13 in the next stage.

Denoted by 14 is a memory means comprising a plurality of frame memories 14-1, 14-2, 14-3 . . . 14-i, and reproduced image data from the VTR 10 are sequentially stored per frame in such memory means 14.

A memory controller 15 serves to control the operation of writing the data in or reading out the same from the memory means 14. The control is so performed that the image data obtained from the VTR 10 are sequentially transferred to the frame memories 14-1, 14-2, 14-3 . . . 14-i in response to a control signal and a clock signal outputted from the memory controller 15.

In case the reproduced image from the VTR 10 is composed of an analog signal, an A/D converter and a D/A converter are additionally provided in the stages anterior and posterior to the memory means 14, respectively.

Figure 2:
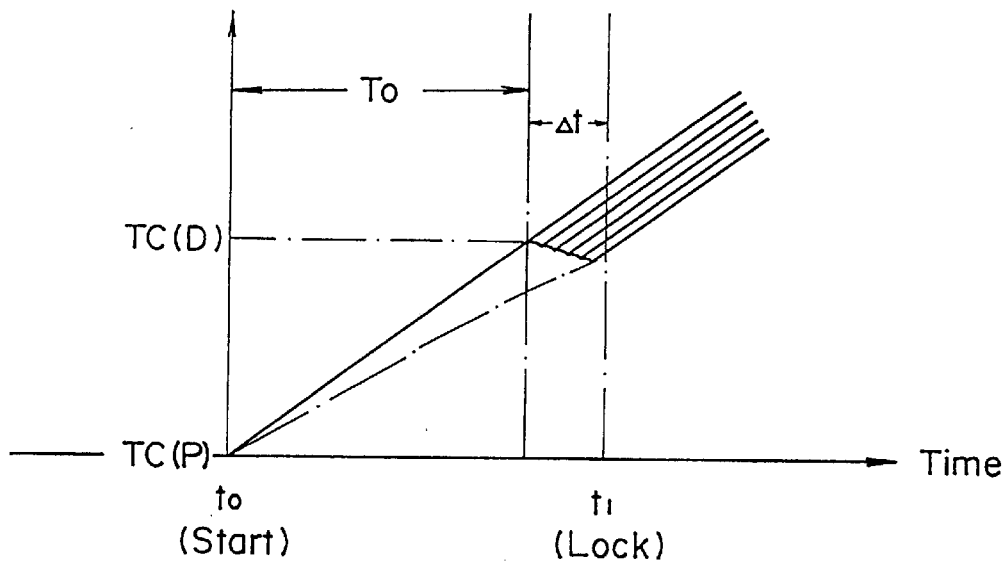
FIG. 2 graphically represents the relationship between the time code and the lapse of time on a magnetic tape reproduced by a VTR.
Figure 3:
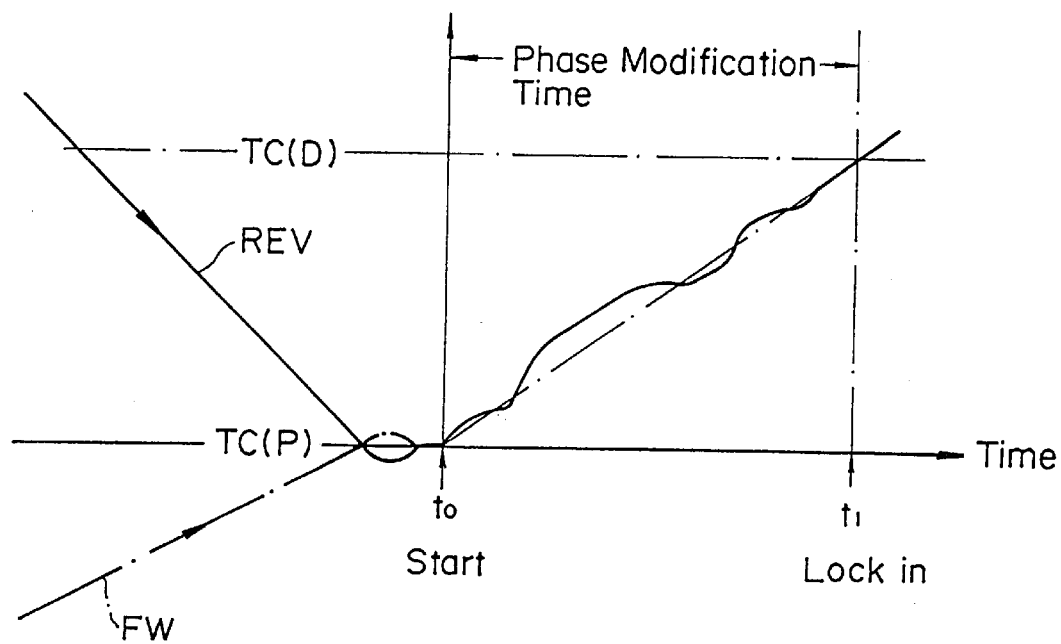
FIG. 3 graphically represents the operation of a conventional VTR equipped with a phase modifier.

Referring now to FIG. 2, a description will be given below with regard to how the operation is performed in the video signal reproducing apparatus of the image fast locking system according to the present invention.

Upon designation of the time code (including frame number) of the image recorded on the magnetic tape loaded in the VTR 10, the time code slightly anterior to the designated time code TC(D) is set as a preroll point in the same manner as in the conventional example, so that the VTR 10 is placed in a still reproduction mode at the position of the time code TC(P) relative to such preroll point.

However, according to the fast locking system of the present invention, the difference between the time code TC(P) relative to the preroll point and the time code TC(D) relative to the designated image may be set at most to a time $T_0$ (about 1 second) which is required until the synchronism is stabilized after start of the reproduction and normal video data is outputted.

Subsequently the reproduction is performed in response to a start signal $V_S$ inputted upon completion of the preroll. The image data outputted posterior to the start are sequentially transferred to the frame memories 14-1, 14-2, 14-3 . . . 14-i, which constitute the memory means 14, in accordance with the control signal outputted from the memory controller 15.

Meanwhile, the time code relative to the image immediately after the reproduction is outputted via the time code extractor 11 to the digital comparator 12, which then compares such time code with the reference time code supplied from an external unit.

Thus, the difference is obtained between the reference time code supplied from an external unit and the time code of the image outputted from the VTR 10 at an instant t of the complete rise, and such code difference is supplied as a frame difference signal $S_{DF}$ from the digital comparator 12 to the demultiplexer 13. In case the frame difference signal $S_{DF}$ has a numerical value 3, the video data read out from the 3rd frame memory 14-3 is selected by the demultiplexer 13 and then is fed to the video output terminal.

Thus, the section enclosed with a dotted line 20 can be regarded as a single memory means where the reading and writing operations are controlled by the memory controller 15 and the digital comparator 12.

Figure 4:
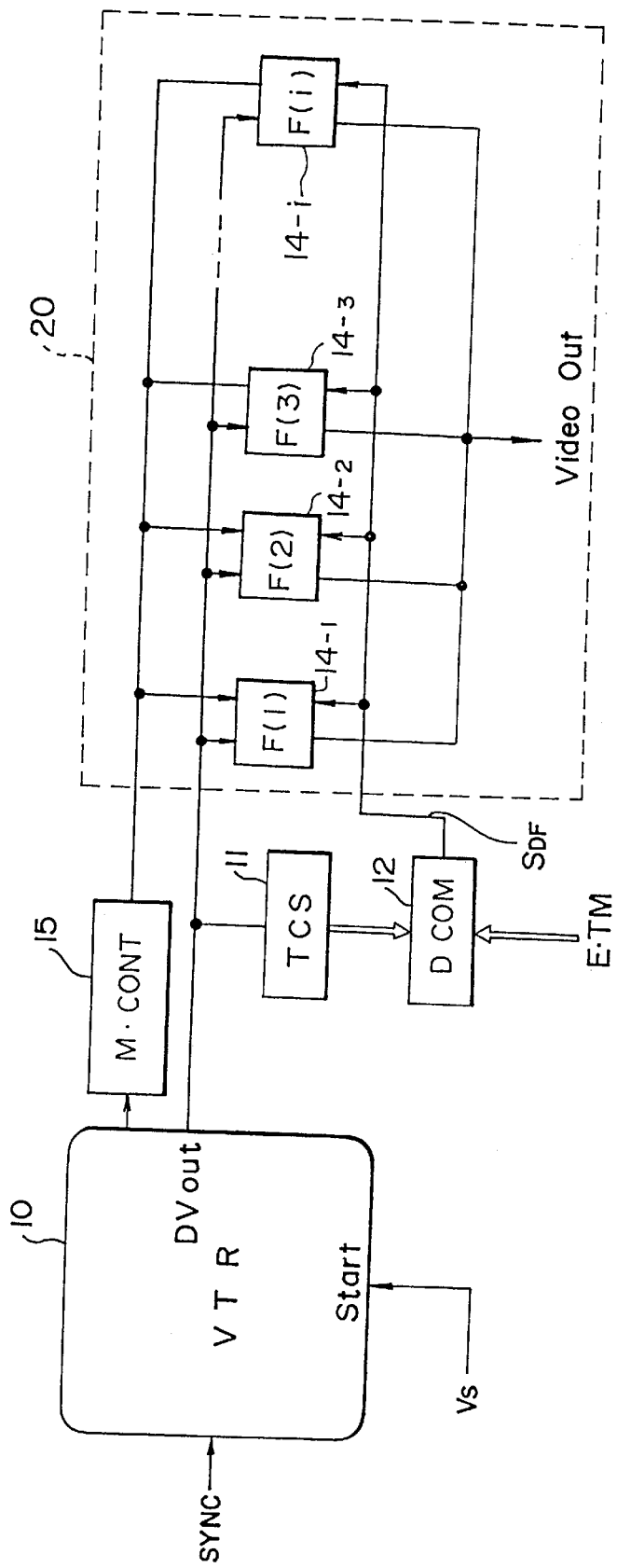
FIG. 4 is a block diagram showing another embodiment of the video signal reproducing apparatus with modified memory means.

Now another exemplary embodiment using such memory means will be described below with reference to FIG. 4.

The memory controller 15 executes its control function in such a manner that the video data reproduced in the VTR 10 can be sequentially written in the frame memories 14. And even after the video data have been written in the entire frame memories, the operation procedure is returned to the first frame memory so that rewriting the video data is performed frame by frame successively.

Meanwhile, the difference between the reproduced time code and the external reference time code is detected by the digital comparator 12, and a decision is made on the basis of the detected difference to select the frame memory from which the video data is to be read out. And then the video data therefrom is fed to the video output terminal.

The frame difference signal $S_{DF}$ is generated due principally to the acceleration error and so forth in the VTR, and its time length is at most 0.2 seconds (equivalent to the time of 5 to 6 frames). Therefore, the number of required frame memories constituting the memory means 14 corresponds practically to a memory capacity of 5 to 6 frames, and the reproduced-image time error caused in the VTR 10 is absorbed within a range Δt by such 5 to 6 frame memories, so that the time code of the reproduced image outputted from the demultiplexer 12 can be rendered completely coincident with the time code inputted from an external unit.

For eliminating such time of 5 to 6 frames under control of a capstan motor in the VTR 10, a phase modification time of 5 to 6 seconds is required as mentioned above, so that it has been impossible heretofore to attain a fast lock to the reference time. However, according to the system of the present invention, the output image time error caused in the VTR is eliminated by selecting the video data stored in the memory means, so that the phase modification for controlling the magnetic tape speed is rendered unnecessary any longer, hence enabling output of the reproduced image locked to the reference time within a short time period of 1 to 1.2 second.

In the embodiment mentioned above, a demultiplexer is provided for selecting the video data of individual frames delayed by the memory means. However, such constitution may be so altered that the number of field memory stages is selected in accordance with the frame difference signal, and merely the video data coincident with the external time code is outputted directly from the field memory.

According to the reproduced-image fast locking system of the present invention, as described above, the phase modification executed heretofore in the conventional VTR is omitted, and the difference from the external reference time (time code) is absorbed by the memory means provided additionally on the output side of the VTR, hence attaining a remarkably great advantage that, after start of the VTR operation, a reproduced image coincident with the reference signal can be outputted fast.

Furthermore, due to the omission of a phase modifier in the VTR, it becomes possible to ensure an additional advantage of realizing dimensional reduction of the apparatus and curtailment of its production cost.

What is claimed is:

1. A video signal reproducing apparatus for reproduction of a video signal recorded on a recording medium in synchronism with a reference time code signal supplied from outside said apparatus wherein a time code signal is also recorded corresponding to each frame or field of the video signal, said apparatus comprising:

first reproducing means for sequentially reproducing the video signal from said recording medium;

memory means having a plurality of storage areas for storing a respective plurality of frames of the video signals sequentially reproduced from said recording medium;

second reproducing means for reproducing the time code signal from said recording medium;

time code comparing means for comparing the time code signal reproduced by said second reproducing means with the reference time code signal supplied from outside, thereby generating a control signal; and reading control means for controlling said memory means and selectively and sequentially reading frames of the video signal one after another from only one storage area of said memory means in accordance with the control signal so that the time code signal corresponding to the frame of the video signal read from said one storage area of said memory means is synchronized with the reference time code signal.

2. An apparatus according to claim 1, wherein said memory means comprises a plurality of frame memories each having a storage capacity of one frame of the video signal, said frame memories being serially connected so as to transfer a stored content to the adjacent frame memory sequentially one after another, and the video signal reproduced from said recording medium is supplied to one end of said serially connected frame memories.

3. An apparatus according to claim 2, wherein said memory means further comprises multiplexer means for receiving a plurality of the video signals read from said frame memories, then selecting and outputting one of them in response to said control signal.

4. An apparatus according to claim 1, further including writing control means for controlling said memory means which comprises a plurality of frame memories each having a storage capacity of one frame of the video signal, wherein said writing control means serves to control the writing operations of said frame memories so as to selectively write the video signal reproduced from said recording medium into a selected one of said frame memories, and said reading control means serves to control the reading operations of said frame memories so as to selectively read the video signal from said selected one of said frame memories.

5. A video signal reproducing apparatus for reproducing a video signal recorded on a recording medium and synchronized with a reference time code signal supplied from a source external to said recording medium, wherein a time code signal is also recorded corresponding to each frame or field of the video signal, said apparatus comprising:

a video signal reproducing apparatus for sequentially reproducing said video signal from said recording medium;

memory means having a plurality of storage areas for storing a respective plurality of frames of the video signal sequentially reproduced from said recording medium;

a time code signal extractor for extracting said time code signal from said recording medium;

a frame difference signal generating means for generating a frame difference signal based on a comparison of said extracted time code signal and said reference time code signal generated from said external source; and reading control means providing a control signal for controlling said memory means and sequentially reading frames of the video signal one after another from only one storage area of said memory means in response to said frame difference signal, so that the time code signal corresponding to the frame of the video signal read from said memory means is synchronized with the reference time code signal.

6. The apparatus as set forth in claim 5, wherein said frame difference signal generating means includes a comparator for comparing data from said time code extractor with said reference time code signal obtained from an external unit.

7. The apparatus as set forth in claim 5, wherein said reading control means includes a memory controller for controlling writing data in or reading data out of said memory means for sequentially transferring image data from said video signal reproducing apparatus to frame memories in said memory means in response to said control signal and a clock signal outputted from said memory controller.

8. The apparatus as set forth in claim 5, wherein said memory means includes a number of frame memories which correspond practically to a memory capacity of five or six frames so that the time code of the reproduced image outputted from a multiplexer can be made coincident with the real-time reference time code inputted from an external unit.

9. The apparatus as set forth in claim 5, wherein said memory means comprises a plurality of frame memories each having a storage capacity of one frame of the video signal, said frame memories being serially connected so as to transfer a stored content to the adjacent frame memory sequentially one after another, and the video signal reproduced from said recording medium is supplied to one end of said serially connected frame memories.

10. The apparatus as set forth in claim 5, wherein said memory means further comprises a plurality of frame memories and multiplexer means for receiving a plurality of video signals read from said frame memories, then selecting and outputting one of them in response to said control signal.

11. The apparatus as set forth in claim 5, further comprising writing control means for controlling said memory means, which comprises a plurality of frame memories each having a storage capacity of one frame of the video signal, wherein said writing control means serves to control the writing operations of said frame memories so as to selectively write the video signal reproduced from said recording medium into a selected one of said frame memories, and said reading control means serves to control the reading operations of said frame memories so as to selectively read the video signal from a selected one of said frame memories.

* * * * *